No. 776,876. Patented December 6, 1904.

UNITED STATES PATENT OFFICE.

DANIEL WATTS TROY, OF MONTGOMERY, ALABAMA.

APPARATUS FOR WIRELESSLY TRANSMITTING ELECTRICAL ENERGY.

SPECIFICATION forming part of Letters Patent No. 776,876, dated December 6, 1904.

Application filed March 19, 1903. Renewed October 26, 1904. Serial No. 230,027. (No model.)

*To all whom it may concern:*

Be it known that I, DANIEL WATTS TROY, a citizen of the United States of America, residing in the city and county of Montgomery, State of Alabama, (whose post-office address is First National Bank Building, in said city,) have invented certain new and useful Improvements in Apparatus for Wirelessly Transmitting Electrical Energy, of which the following is a specification, reference being had to the accompanying drawings, forming a part hereof.

My invention relates primarily to the transmission of electrical energy by a unilateral or open-circuit conducting-path, and relates particularly to the transmission of through earth as a conducting path. By such transmission through the earth electrical energy may be utilized for wireless telegraphy and like uses, and to such extent my invention is analogous to the wireless systems of Marconi, Lodge, and others, though entirely different in principle of operation or construction.

My principal objects are to provide an efficient means for transmitting electrical energy by a unilateral path or open circuit for all purposes where desirable and with special reference to transmitting through the earth as the single conducting-path. By "earth" sea is of course included.

I attain these objects by the means set forth below.

Figure 2:
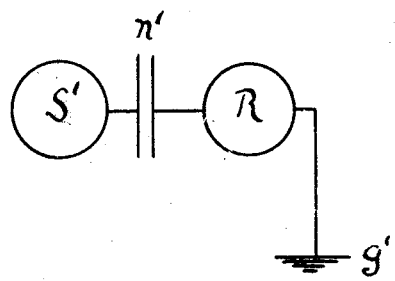
Figure 1:
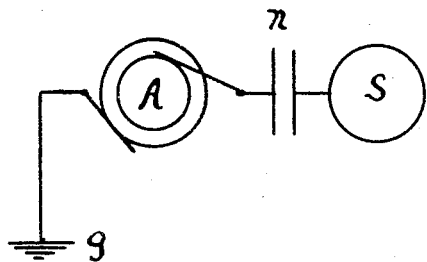
Figure 3:
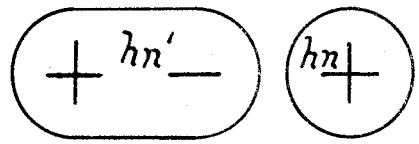
Figure 4:
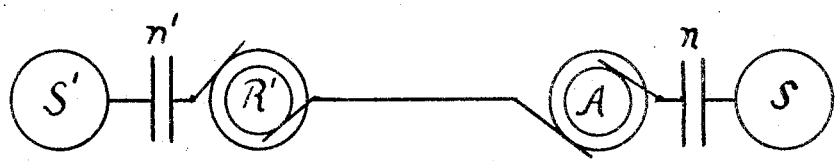

In the drawings, Figure 1 is a diagrammatic view of my transmission apparatus; Fig. 2, a diagram of the receiving apparatus. Fig. 3 is a diagram showing distribution of static electricity on adjacent conductors as a part of the explanation of the action of the system. Fig. 4 is a diagram of my transmitting and receiving apparatus shown connected by a metallic conductor.

Referring to Fig. 1, A is a source of alternating, pulsatory, or oscillatory currents, one terminal connected to earth at $g$, and the other to one side of a condenser $n$, the other side of $n$ being connected to a surface of capacity S. Only the essential parts are shown in the figure. At a distance a second ground $g'$ is connected through a responsive instrument to one side of a second condenser $n'$, to the other side of which is connected a second surface of capacity $S'$, such capacity-surfaces of course being conducting-bodies. The object of the capacity surfaces or areas is as follows: The "alternator," as we may term it, A transmits, say, an impulse in direction regarded as toward $g$, thus causing a "negative" electrification on the alternator side of $n$ and a "positive" induced electrification on the remote side of $n$. The effect of the condenser connected as shown to the capacity area is to allow a "piling up," so to speak, of the electrical charge, the energy impressed on the alternator side of $n$ causing an electrostatic disturbance of the remote condenser-capacity area system, similar to the condition shown in Fig. 3, where a charged body $hn$ is shown causing a condition of electro static unbalance in an adjacent body $hn'$.

In Fig. 4 a responsive apparatus, as a motor, is shown at R', with its condenser and capacity area S' and $n'$ connected in an open circuit with the transmitting system. The alternating current if the condensers and capacity areas are properly related or of proportionate size to the amount of energy to be transmitted can surge back and forth through the system, the condensers and capacity areas acting somewhat after the manner of elastic receivers to hold and discharge the surges of energy as the current alternates. In using the earth as a conducting-path instead of a wire, as in Fig. 4, the receiving apparatus shown in Fig. 2 would of course receive only a fraction of the energy transmitted into the earth at $g$. There is a distinct and radical difference between such a system and the method used by Dolbear, shown in his patent, No. 305,299, October 5, 1886, in that the capacity areas of my invention are not used by him nor is their use recognized. Without the capacity-condenser arrangement transmission through the earth must necessarily be extremely inefficient. I am also familiar with the patent to A. F. Collins, No. 685,742, November 5, 1901; but there is a still more radical difference between his system and mine as applied to the transmission of energy through the earth.

It is obvious that any desired type of receiver responsive to the received impulses may be used at R whether the use be by earth transmission or otherwise. In Fig. 4, R' is drawn as an alternating-current motor; but obviously no special type is intended. The source of electrical impulses A may be an induction-coil (in which case its secondary would be connected as shown, one terminal to earth and one to the condenser $n$) or any other source of periodic electrical impulses. It is obvious that with a source of alternating, pulsatory, or oscillatory current impulses the frequency of such impulses can be controlled by means well known in the art, as well as the setting up of such impulses by key or otherwise for telegraphic purposes or by suitable switches in power transmission. Apparatus of this character of course forms no part of this invention in itself, as already well known.

It is obvious that changes of frequency might be made in utilizing the method and apparatus herein shown in telegraphy to advantage for selective purposes.

Having described my invention, what I claim is—

1. In the wireless transmission of electrical energy by means of electrical impulses transmitted through the earth, an otherwise-insulated capacity area connected electrically in series through a condenser and a source of electrical impulses to a ground, substantially as set forth.

2. In the wireless transmission of electrical energy by means of electrical impulses transmitted through the earth an otherwise-insulated capacity area connected electrically in series through a condenser and a source of electrical impulses to a ground, and means for controlling the setting up of such impulses, substantially as set forth.

3. In the wireless transmission of electrical energy by means of electrical impulses transmitted through the earth an otherwise-insulated capacity area connected electrically in series through a condenser and a source of electrical impulses to a ground, means for setting up such impulses at a given rate and means for controlling the setting up of said impulses, substantially as set forth.

4. In the wireless transmission of electrical energy by means of electrical impulses transmitted through the earth an otherwise-insulated capacity area connected electrically in series through a condenser and a source of electrical impulses to a ground, and at a distance a similar capacity area otherwise insulated and connected electrically in series through a condenser and a receiver sensitive to such impulses to another ground, substantially as set forth.

5. In the wireless transmission of electrical energy by means of electrical impulses transmitted through the earth, an otherwise-insulated capacity area connected electrically in series through a condenser and a source of electrical impulses to a ground, means for controlling the setting up of said impulses, and at a distance a similar capacity area otherwise insulated and connected electrically in series through a condenser and a receiver sensitive to such impulses to another ground, substantially as set forth.

6. In the wireless transmission of electrical energy by means of electrical impulses transmitted through the earth an otherwise-insulated capacity area connected electrically in series through a condenser and a source of electrical impulses to a ground, means for setting up such impulses at a normal fixed rate, means for altering the rate of such impulses, and at a distance another similar capacity area, otherwise insulated and connected electrically in series through a condenser and a receiver sensitive to such impulses at such normal rate to another ground, substantially as set forth.

7. In the wireless transmission of electrical energy by means of electrical impulses transmitted through the earth an otherwise-insulated capacity area connected electrically in series through a condenser and a receiver sensitive to electrical impulses to a ground, substantially as set forth.

8. In the transmission of electrical energy by a unilateral transmission-line having a portion of its length embraced of the earth capacity areas otherwise insulated and connected electrically to the ends of such line respectively by condensers, substantially as set forth.

9. In the wireless transmission of electrical energy by means of electrical impulses transmitted through the earth, an insulated capacity area, connected electrically by a condenser through a source of electrical impulses to a ground, and at a distance a similar insulated capacity area, connected electrically by a condenser, through a motor adapted to be operated by such impulses, to another ground.

In witness whereof I have hereunto set my hand, at Montgomery, Alabama, this 16th day of March, 1903.

DANIEL WATTS TROY.

Witnesses:
 EDWARD S. WATTS,
 KENT K. PARROT.